(12) United States Patent
Honjo et al.

(10) Patent No.: US 11,247,577 B2
(45) Date of Patent: Feb. 15, 2022

(54) VEHICLE

(71) Applicant: HONDA MOTOR CO., LTD., Tokyo (JP)

(72) Inventors: Takuya Honjo, Saitama (JP); Daisuke Takeuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 41 days.

(21) Appl. No.: 17/012,827

(22) Filed: Sep. 4, 2020

(65) Prior Publication Data

US 2021/0061115 A1 Mar. 4, 2021

(30) Foreign Application Priority Data

Sep. 4, 2019 (JP) .............................. JP2019-161229

(51) Int. Cl.
 *B60L 53/24* (2019.01)
 *B60L 58/12* (2019.01)
 (Continued)

(52) U.S. Cl.
 CPC .............. *B60L 53/24* (2019.02); *B60L 50/60* (2019.02); *B60L 58/12* (2019.02); *B60L 58/26* (2019.02);
 (Continued)

(58) Field of Classification Search
 CPC .......... B60L 53/24; B60L 50/60; B60L 58/12; B60L 58/26; B60L 58/27; B60L 2240/545; B60L 1/003; B60L 3/0023; H01M 10/46; H01M 10/486; H01M 10/613; H01M 10/615; H01M 10/625; H01M 10/63; H01M 10/6568; H01M 2220/20; H02J 7/007194;
 (Continued)

(56) References Cited

U.S. PATENT DOCUMENTS

| 6,360,835 B1 * | 3/2002 | Skala | H01M 8/04029 |
| | | | 180/65.22 |
| 7,789,176 B2 * | 9/2010 | Zhou | B60H 1/32281 |
| | | | 180/65.1 |

(Continued)

FOREIGN PATENT DOCUMENTS

| EP | 3753764 A1 * | 12/2020 | ......... B60H 1/00885 |
| EP | 3647679 A4 * | 3/2021 | .............. F25B 13/00 |

(Continued)

*Primary Examiner* — M Baye Diao
(74) *Attorney, Agent, or Firm* — Paratus Law Group, PLLC (57) ABSTRACT

A vehicle comprising a battery, a power converter, a charger, a first and a second temperature adjustment circuit including a first and a second pumps for supplying a heat medium, a coupling passage which forms a coupling circuit by coupling the first and the second temperature adjustment circuits, a switching unit capable of switching a state between a circulation state and a non-circulation state, and a control device to select one mode from a plurality of modes. The plurality of modes includes a series mode in which the heat medium is circulated in the coupling circuit in the circulation state and a separate mode in which the heat medium is circulated in at least the second temperature adjustment circuit in the non-circulation state. The control device executes the series mode when charging the battery.

14 Claims, 9 Drawing Sheets

(51) Int. Cl.
*B60L 58/26* (2019.01)
*B60L 58/27* (2019.01)
*H02J 7/00* (2006.01)
*H01M 10/46* (2006.01)
*H01M 10/613* (2014.01)
*H01M 10/625* (2014.01)
*H01M 10/615* (2014.01)
*H01M 10/48* (2006.01)
*H01M 10/63* (2014.01)
*H01M 10/6568* (2014.01)
*B60L 50/60* (2019.01)

(52) U.S. Cl.
CPC ............ *B60L 58/27* (2019.02); *H01M 10/46* (2013.01); *H01M 10/486* (2013.01); *H01M 10/613* (2015.04); *H01M 10/615* (2015.04); *H01M 10/625* (2015.04); *H01M 10/63* (2015.04); *H01M 10/6568* (2015.04); *H02J 7/007194* (2020.01); *H01M 2220/20* (2013.01); *H02J 2207/20* (2020.01)

(58) Field of Classification Search
CPC ... H02J 2207/20; H02J 7/00309; Y02E 60/10; Y02T 10/70; Y02T 10/7072; Y02T 10/92; Y02T 90/14; B60K 1/00; B60K 2001/005
USPC ........................................................ 320/150
See application file for complete search history.

(56) References Cited

U.S. PATENT DOCUMENTS

| | | | |
|---|---|---|---|
| 8,336,319 B2 * | 12/2012 | Johnston | B60L 3/0046 62/79 |
| 10,562,376 B2 * | 2/2020 | Miura | B60H 1/08 |
| 2012/0222441 A1 * | 9/2012 | Sawada | B60H 1/32284 62/238.1 |
| 2016/0107501 A1 * | 4/2016 | Johnston | B60H 1/00278 165/202 |

FOREIGN PATENT DOCUMENTS

| | | | | |
|---|---|---|---|---|
| JP | 2013-188098 A | | 9/2013 | |
| JP | 2017105290 A | * | 6/2017 | |
| WO | WO-2020129258 A1 | * | 6/2020 | ............ B60L 53/00 |
| WO | WO-2020129259 A1 | * | 6/2020 | ............ B60L 3/00 |

* cited by examiner

VEHICLE

CROSS-REFERENCE TO RELATED APPLICATIONS

The present application claims the benefit of priority of Japanese Patent Application No. 2019-161229, filed on Sep. 4, 2019, the content of which is incorporated herein by reference.

TECHNICAL FIELD

The present invention relates to a vehicle equipped with a battery and a power converter.

BACKGROUND ART

An electric vehicle which includes a first temperature adjustment circuit, a second temperature adjustment circuit, a pump which circulates a heat medium in at least one of the first temperature adjustment circuit and the second temperature adjustment circuit, a coupling passage which couples the first temperature adjustment circuit and the second temperature adjustment circuit to form a coupling circuit, and a switching unit capable of switching a state between a circulation state in which the heat medium circulates in the coupling circuit and a non-circulation state in which the heat medium does not circulate in the coupling circuit is known.

For example, in JP-A 2013-188098, in an electric vehicle which includes a cooling circuit to cool a battery, a cooling circuit to cool an inverter, a first refrigerant pump provided in the cooling circuit for cooling the battery, a second refrigerant pump provided in the cooling circuit for cooling the inverter, and a switching valve which switches a state between a state (hereinafter also referred to as a circulation state) in which the battery and inverter are temperature-controlled in the same circuit and a state hereinafter also referred to as a non-circulation state) in which the battery and inverter are temperature-controlled in separate circuits, it is described that when the outside air temperature is lower than a predetermined temperature, the circulation state is set, while when the outside air temperature is equal to or higher than the predetermined temperature, the non-circulation state is set to improve the accuracy of temperature adjustment.

SUMMARY

However, since the electric vehicle described in JP-A 2013-188098 switches the state between the circulation state and the non-circulation state according to the outside air temperature, the circulation state and the non-circulation state are switched regardless of the temperature of the power converter. By the way, during charging of the battery, the charger and the battery generate heat regardless of the outside air temperature, so it is necessary to appropriately cool the charger and the battery.

The present invention provides a vehicle capable of appropriately cooling a charger and a battery when charging the battery.

A vehicle including:
a battery,
a power converter,
a charger,
a first temperature adjustment circuit including a first pump for supplying a heat medium to the battery and the charger, a second temperature adjustment circuit including a second pump for supplying the heat medium to the power converter and a heat exchange unit for exchanging heat between the heat medium and the outside air,
a coupling passage which forms a coupling circuit by coupling the first temperature adjustment circuit and the second temperature adjustment circuit,
a switching unit capable of switching a state between a circulation state in which the heat medium can circulate in the coupling circuit and a non-circulation state in which the heat medium cannot circulate in the coupling circuit, and
a control device to select one mode from a plurality of modes.

The plurality of modes includes:
a series mode in which the heat medium is circulated in the coupling circuit in the circulation state; and
a separate mode in which the heat medium is circulated in at least the second temperature adjustment circuit in the non-circulation state.

The control device executes the series mode when charging the battery.

According to the present invention, by executing the series mode when charging the battery, it is possible to cool the charger and the battery using the heat exchange unit provided in the second temperature adjustment circuit. As a result, it is possible to efficiently cool the charger and the battery when charging the battery.

DESCRIPTION OF EMBODIMENTS

An embodiment of the present invention will be described below with reference to FIGS. 1 to 9.

<Vehicle>

Figure 1:
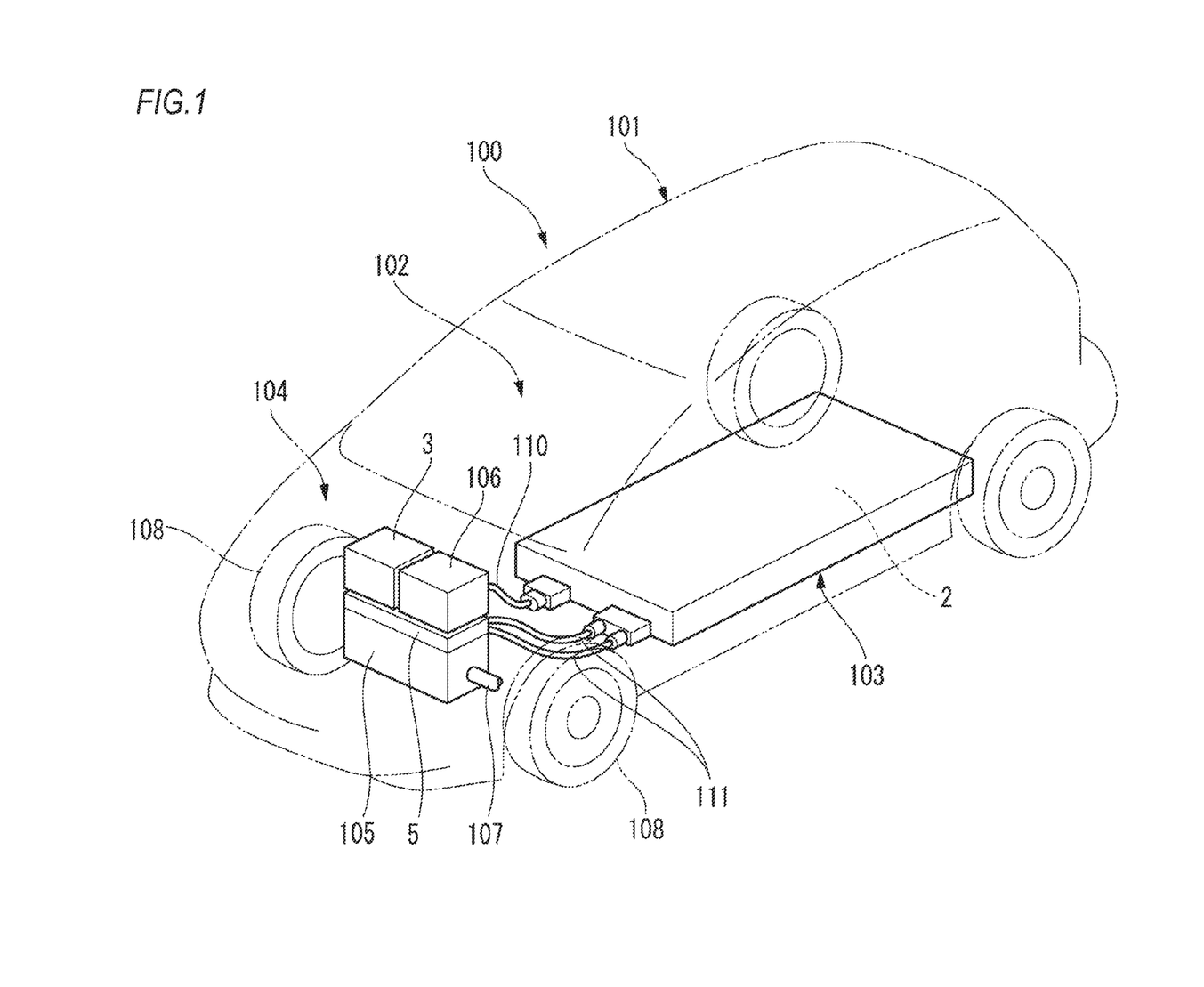
FIG. 1 is a perspective view illustrating a schematic configuration of a vehicle according to an embodiment of the present invention.

As illustrated in FIG. 1, a vehicle 100 may be an electric vehicle having only an electric motor as a drive source, a fuel cell vehicle, or a hybrid vehicle having an electric motor and an internal combustion engine. However, in the following description, an electric vehicle will be described as an example. In FIG. 1, a temperature adjustment circuit 1 and an air conditioner AC, which will be described below, are omitted.

A vehicle body 101 of the vehicle 100 is equipped with a battery case 103 which accommodates a battery 2 in an underfloor portion of a vehicle compartment 102. A motor room 104 is provided in the front part of the vehicle 100. In the motor room 104, a motor 105, a power converter 5, a branch unit 106, a charger 3 and the like are provided.

The rotational driving force of the motor 105 is transmitted to a shaft 107. Front wheels 108 of the vehicle 100 are connected to both ends of the shaft 107. The power converter 5 is electrically connected to a connector of the battery case 103 by a power cable 111. Further, the power converter 5 is electrically connected to the motor 105 by, for example, a three-phase bus bar. The power converter 5 drives the motor 105 with the electric power supplied from the battery 2 and charges the battery 2 with the electric power supplied from the motor 105.

The charger 3 is electrically connected to the connector of the battery case 103 by a cable 110 via the branch unit 106. The charger 3 is connected to a general external power source such as a household power source to charge the battery 2.

<Temperature Adjustment Circuit>

Figure 2:
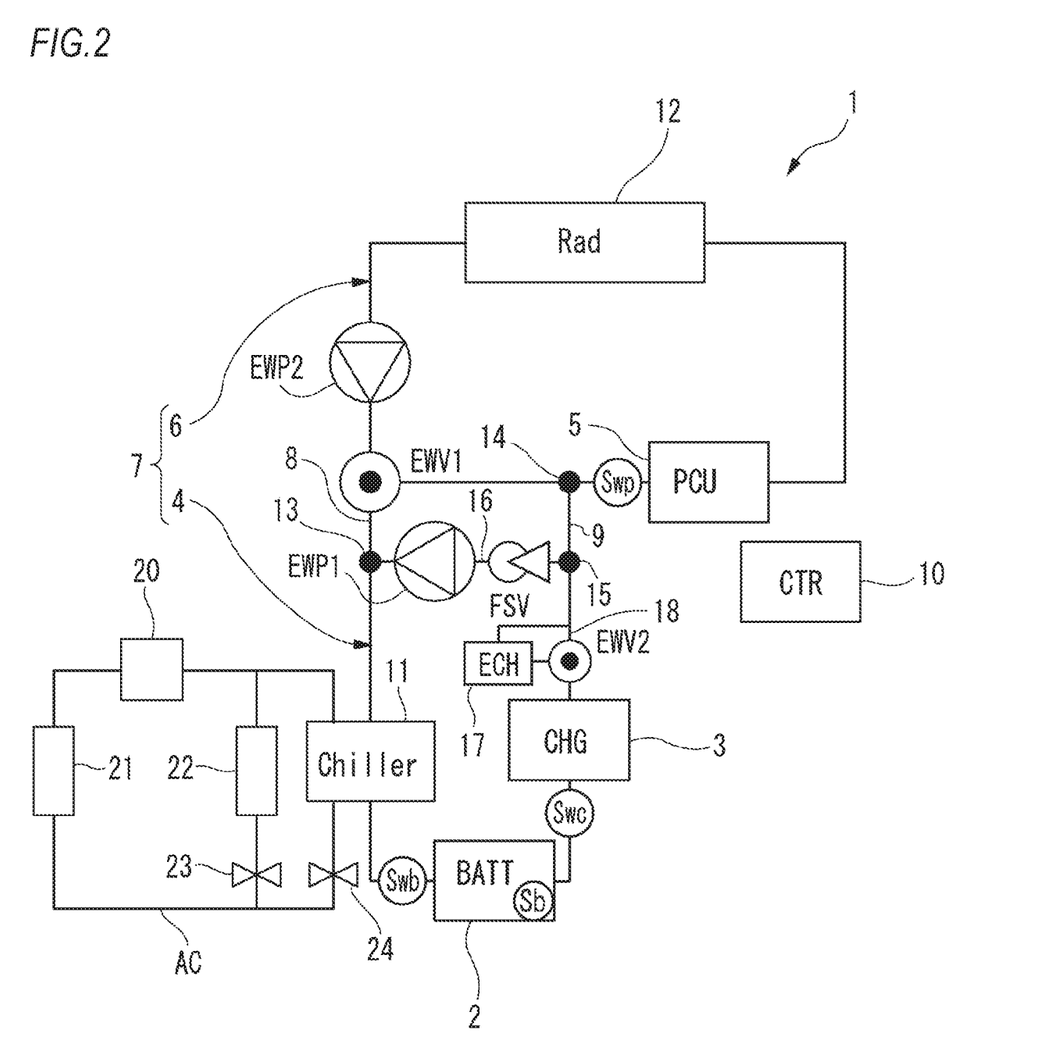
FIG. 2 is a circuit diagram illustrating a configuration of a temperature adjustment circuit provided in the vehicle.

The temperature adjustment circuit 1 illustrated in FIG. 2 is mounted on the vehicle 100. The temperature adjustment circuit 1 includes a first temperature adjustment circuit 4 which includes a first pump DAT 1 for supplying a heat medium to the battery 2 and the charger 3, a chiller 11 capable of exchanging heat between the heat medium and a heat medium for air conditioning, and a heater 17 capable of heating the heat medium, a second temperature adjustment circuit 6 which includes a second pump EWP2 for supplying the heat medium to the power converter 5 and a radiator 12 for exchanging heat between the heat medium and the outside air, a first coupling passage 8 and a second coupling passage 9 which form a coupling circuit 7 by coupling the first temperature adjustment circuit 4 and the second temperature adjustment circuit 6, a first electromagnetic switching valve EWV1 capable of switching between a circulation state in which the heat medium can circulate in the coupling circuit 7 and a non-circulation state in which the heat medium cannot circulate in the coupling circuit 7, and a control device 10 which selects any one of the plurality of modes. The heat medium is a liquid medium such as water, a radiator liquid, and a coolant liquid.

<Modes>

The plurality of modes include a series mode (see FIG. 6) in which, in the circulation state, the heat medium is circulated in the coupling circuit 7 in a state where the chiller 11 cannot exchange heat between the heat medium and the heat medium for air conditioning and a separate mode (see FIGS. 3 to 5) in which the heat medium is circulated in at least the second temperature adjustment circuit 6 in the non-circulation state. The separate mode includes a separate basic mode (see FIG. 3) in which, in the non-circulation state, the heat medium is circulated in the second temperature adjustment circuit 6, a separate cooling mode (see FIG. 4) in which, in the non-circulation state, the heat medium is circulated in the second temperature adjustment circuit 6 and the heat medium is circulated in the first temperature adjustment circuit 4 so that the chiller 11 can exchange heat between the heat medium and the heat medium for air conditioning, and a separate heating mode (see FIG. 5) in which, in the non-circulation state, the heat medium is circulated in the second temperature adjustment circuit 6 and the heat medium is circulated in the first temperature adjustment circuit 4 in a state where the heater 17 is allowed to heat the heat medium. The separate basic mode is not a mode for prohibiting the circulation of the heat medium in the first temperature adjustment circuit 4. For example, in the separate mode, the heat medium may be circulated in the first temperature adjustment circuit 4 without operating the chiller 11 to eliminate the temperature deviation of the heat medium.

<First Temperature Adjustment Circuit>

The first temperature adjustment circuit 4 includes the first pump EWP1 for circulating the heat medium in the circuit, the chiller 11 which is arranged on the downstream side of the first pump EWP1 and which can exchange heat between the heat medium and the heat medium for air conditioning, the battery 2 and the charger 3 which are arranged on the downstream side of the chiller 11, the heater 17 which is arranged on the downstream side of the charger 3 and can heat the heat medium, a bypass passage 18 which bypasses the heater 17, a second electromagnetic switching valve EWV2 which is arranged at the upstream end of the bypass passage 18 and switches the state between a state in which the heat medium flows in the heater 17 and a state in which the heat medium flows in the bypass passage 18, and an electromagnetic opening/closing valve FSV which is arranged on the downstream side of the heater 17 and the second electromagnetic switching valve EWV2 and on the upstream side of the first pump EWP1.

Figure 4:
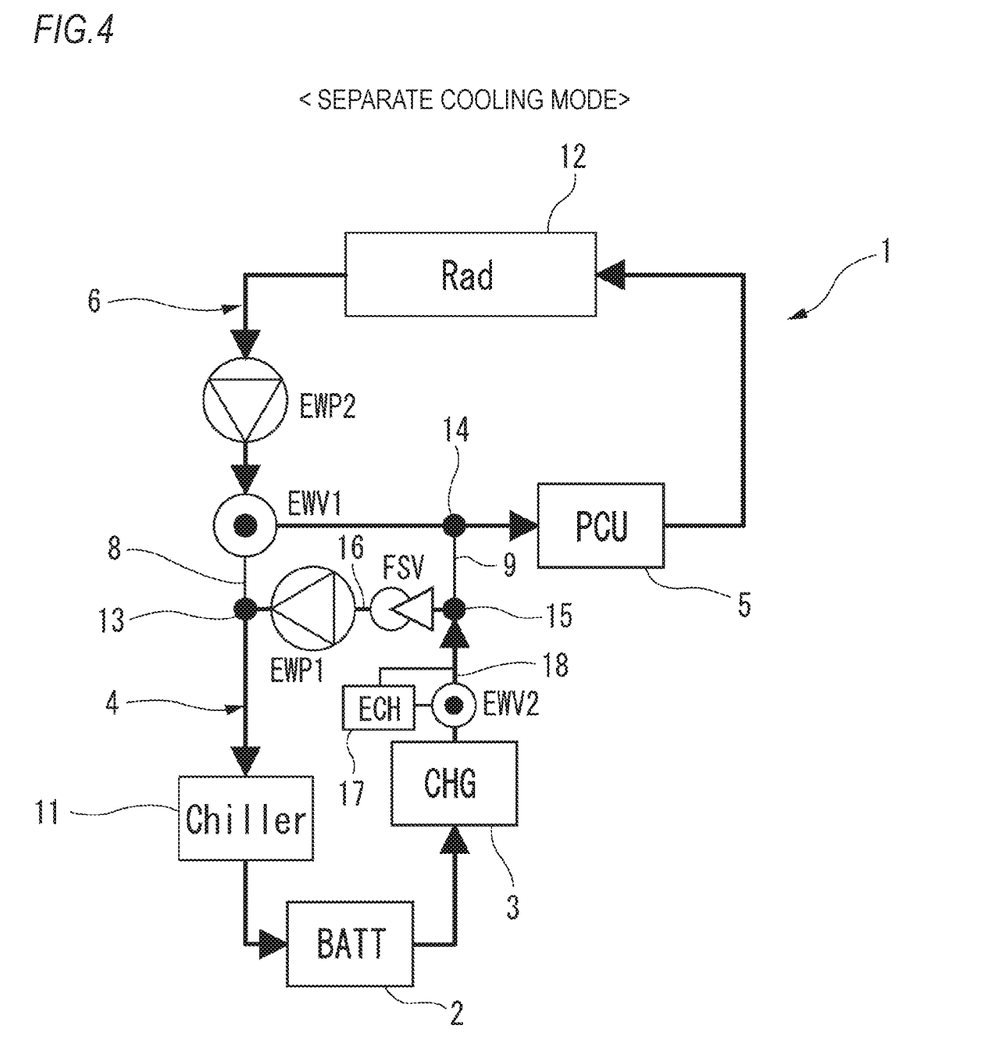
FIG. 4 is an explanatory diagram illustrating the flow of the heat medium in a separate cooling mode in the temperature adjustment circuit of FIG. 2.

As illustrated in FIG. 4, in the separate cooling mode, by opening the electromagnetic opening/closing valve FSV and driving the first pump EWP1 with the second electromagnetic switching valve EWV2 switched to the bypass passage 18 side, the heat medium discharged by the first pump EWP1 can be circulated in the order of the chiller 11 (operating state), the battery 2, and the charger 3. As a result, the heat medium cooled by the operation of the chiller 11 exchanges heat with the battery 2 and the charger 3 and the battery 2 and the charger 3 are cooled.

Figure 5:
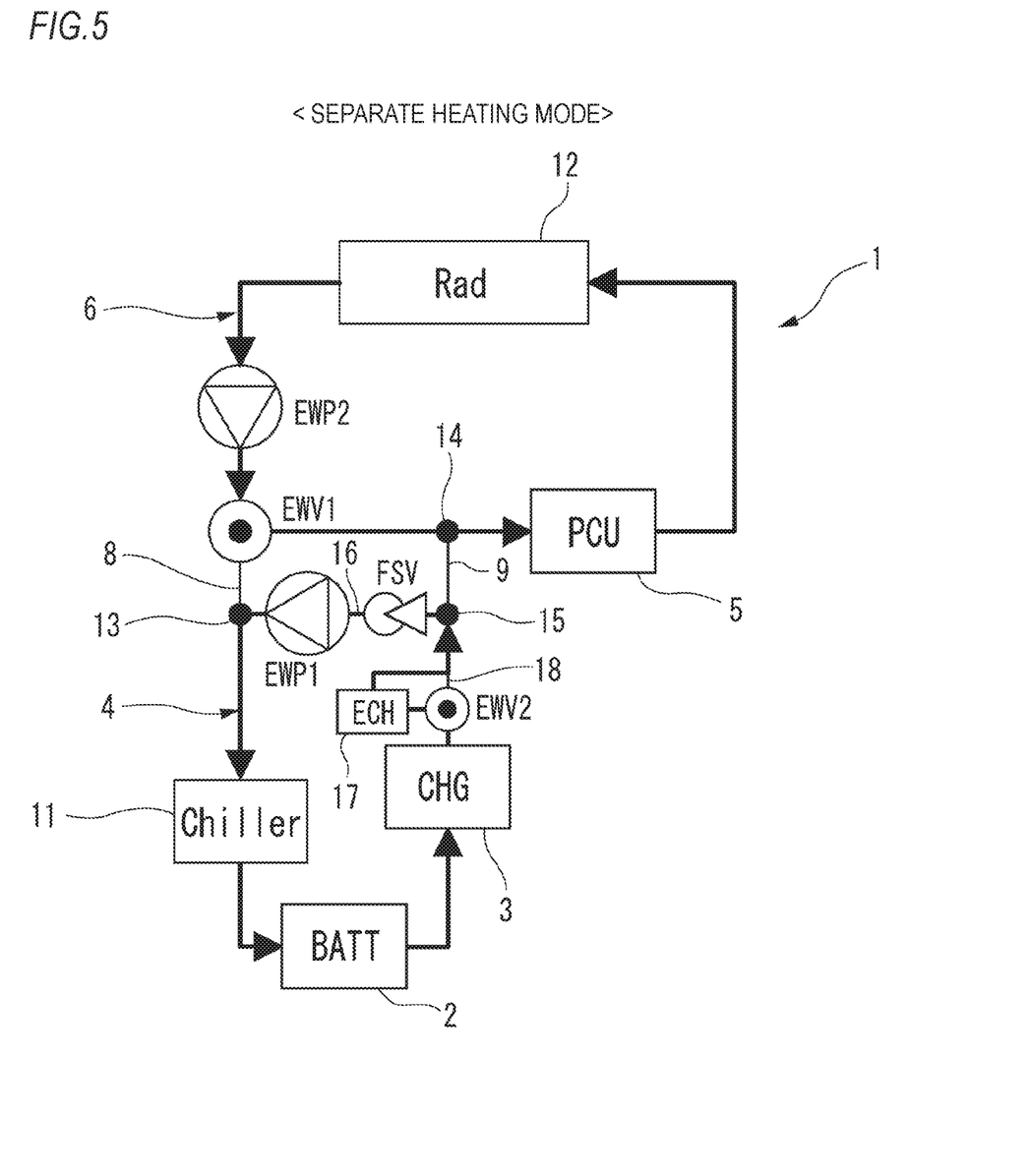
FIG. 5 is an explanatory diagram illustrating the flow of the heat medium in a separate heating mode in the temperature adjustment circuit of FIG. 2.

As illustrated in FIG. 5, in the separate heating mode, by opening the electromagnetic opening/closing valve FSV and driving the first pump EWP1 with the second electromagnetic switching valve EWV2 switched to the heater 17 side, the heat medium discharged by the first pump EWP1 can be circulated in the order of the chiller 11 (non-operating state), the battery 2, the charger 3, and the heater 17 (operating state). As a result, the heat medium heated by the operation of the heater 17 exchanges heat with the battery 2 and the charger 3, and thus the battery 2 and the charger 3 are heated.

Returning to FIG. 2, the air conditioner AC through which the heat medium for air conditioning flows includes a compressor 20, a condenser 21, an evaporator 22, and shutoff valves 23 and 24. The compressor 20, the condenser 21, and the evaporator 22 are connected in series and the evaporator 22 and the chiller 11 are connected in parallel. In the air conditioner AC, the flow path to the evaporator 22 and the flow path to the chiller 11 can be switched by the shutoff valves 23 and 24.

<Second Temperature Adjustment Circuit>

The second temperature adjustment circuit 6 includes the second pump EWP2 for circulating the heat medium in the circuit, the first electromagnetic switching valve EWV1 which is arranged on the downstream side of the second pump EWP2 to switch the mode, the power converter 5 which is arranged on the downstream side of the first electromagnetic switching valve EWV1, and the radiator 12 which is arranged on the downstream side of the power converter 5 for exchanging heat between the heat medium and the outside air. The power converter 5 includes at least one of an inverter which converts DC power into AC power and AC power into DC power and a DC-DC converter which steps up or steps down DC voltage.

Figure 3:
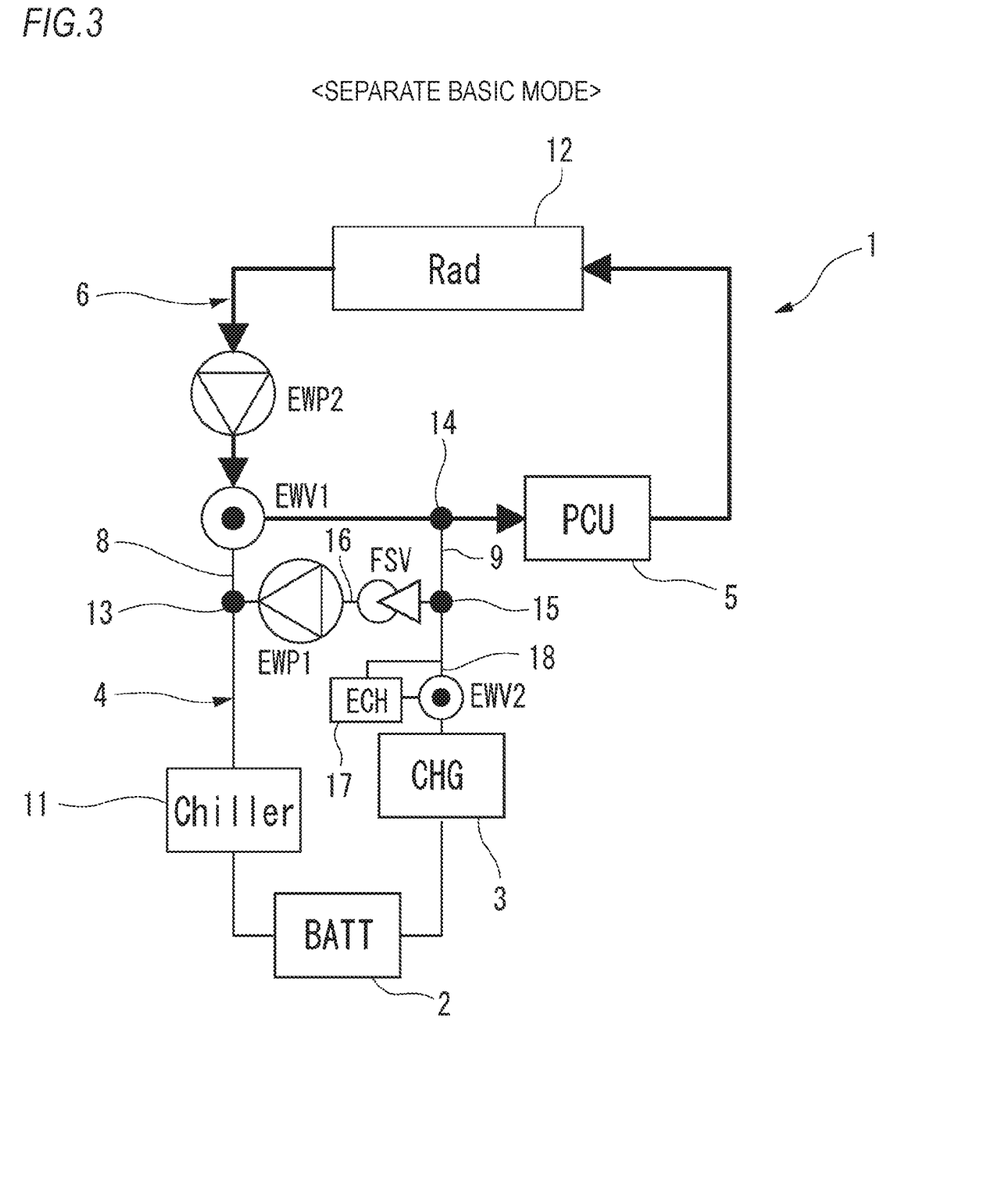
FIG. 3 is an explanatory diagram illustrating a flow of a heat medium in a separate basic mode in the temperature adjustment circuit of FIG. 2

The first electromagnetic switching valve EWV1 of this embodiment is an electromagnetic three-way valve. In the separate mode (including separate basic mode, separate cooling mode, and separate heating mode), the first electromagnetic switching valve EWV1 allows connection between a downstream side flow passage of the second pump EWP2 and an upstream side flow passage of the power converter 5 and blocks connection between the downstream side flow passage of the second pump EWP2 and the first coupling passage 8 described below. Then, in the separate mode, as illustrated in FIGS. 3 to 5, by driving the second pump EWP2, the heat medium discharged by the second pump EWP2 can be circulated in the order of the power converter 5 and the radiator 12. As a result, the heat medium cooled by the radiator 12 exchanges heat with the power converter 5, and thus the power converter 5 is cooled.

Figure 6:
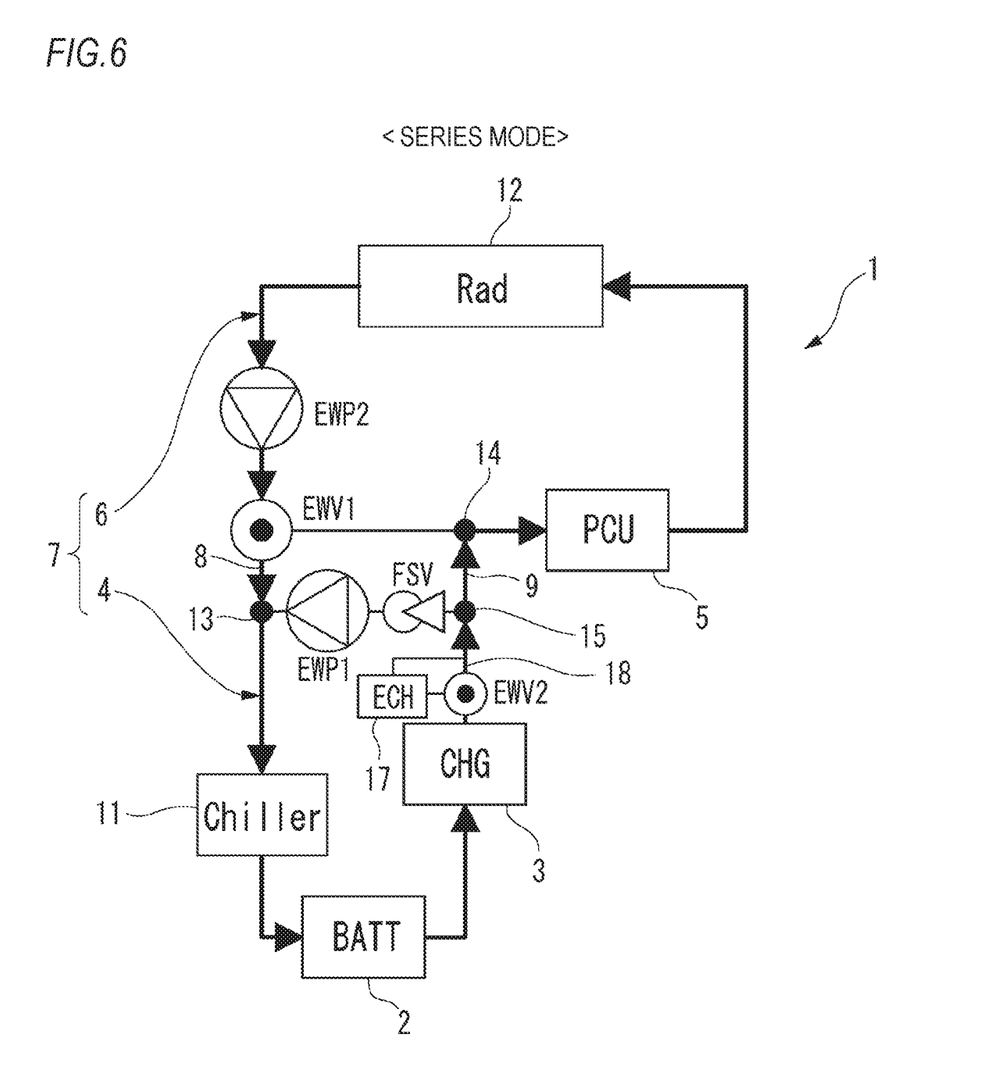
FIG. 6 is an explanatory diagram illustrating the flow of the heat medium in a series mode in the temperature adjustment circuit of FIG. 2.

On the other hand, in the series mode, as illustrated in FIG. 6, the first electromagnetic switching valve EWV1 blocks the connection between the downstream side flow passage of the second pump EWP2 and the upstream side flow passage of the power converter 5 and allows the connection between the downstream side flow passage of the second pump EWP2 and the first coupling passage 8 to be described below. The flow of the heat refrigerant in the series mode will be described below.

<Coupling Circuit>

The coupling passages 8 and 9 include the first coupling passage 8 and the second coupling passage 9. The first coupling passage 8 couples a first connecting portion (first electromagnetic switching valve EWV1) of the second temperature adjustment circuit 6 and a first connecting portion 13 of the first temperature adjustment circuit 4 and the second coupling passage 9 couples a second connecting portion 14 of the second temperature adjustment circuit 6 and a second connecting portion 15 of the first temperature adjustment circuit 4. The second connecting portion 14 of the second temperature adjustment circuit 6 is located on the downstream side of the first electromagnetic switching valve EWV1 in the second temperature adjustment circuit 6 and on the upstream side of the power converter 5. The first connecting portion 13 of the first temperature adjustment circuit 4 is located on the downstream side of the first pump EWP1 in the first temperature adjustment circuit 4 and on the upstream side of the chiller 11. The second connecting portion 15 of the first temperature adjustment circuit 4 is located on the downstream side of the heater 17 and the second electromagnetic switching valve EWV2 in the first temperature adjustment circuit 4 and on the upstream side of the electromagnetic opening/closing valve FSV.

The passage between the first connecting portion 13 and the second connecting portion 15 in the first temperature adjustment circuit 4, that is, the passage in which the first pump EWP1 and the electromagnetic opening/closing valve FSV are arranged in the first temperature adjustment circuit 4 functions as a branch passage 16 which bypasses a part of the coupling circuit 7.

As illustrated in FIG. 6, in the series mode in which the heat medium circulates in the coupling circuit 7, the operations of the first pump EWP1, the chiller 11, and the heater 17 are stopped and the heat medium is circulated by driving the second pump EWP2. As a result, the heat medium discharged from the second pump EWP2 circulates in the order of the battery 2, the charger 3, the power converter 5, and the radiator 12, and thus the battery 2, the charger 3, and the power converter 5 are cooled. In the series mode, the electromagnetic opening/closing valve FSV is closed to stop the circulation of the heat medium via the branch passage 16.

<Control Device>

A control device 10 receives temperature information from a battery temperature sensor Sb for obtaining a battery temperature Tb, which is the temperature of the battery 2 (cell), a battery medium temperature sensor Swb for obtaining a battery medium temperature Twb, which is the temperature of the heat medium at the inlet of the battery 2, a power converter medium temperature sensor Swp for obtaining a power converter medium temperature Twp, which is the temperature of the heat medium at the inlet of the power converter 5, and a charger medium temperature sensor Swc for obtaining a charger medium temperature Twc, which is the temperature of the heat medium at the inlet of the charger 3 and one of the modes is selected according to the battery temperature Tb, the battery medium temperature Twb, the power converter medium temperature Twp, the charger medium temperature Twc, and the vehicle state (battery charging, travelling, or the like).

<Mode Switching Process when Battery Charging>

The control device 10 executes the series mode when charging the battery 2. According to such a mode switching process at the time of charging the battery, the battery 2 and the charger 3 can be cooled by using the radiator 12 provided in the second temperature adjustment circuit 6. Therefore, it is possible to efficiently cool the battery 2 and the charger 3 when charging the battery 2 without using the chiller 11 which consumes a large amount of power. In addition, the amount of heat generated during battery charging is larger in the battery 2 than in the power converter 5 and larger in the charger 3 than in the battery 2.

Further, the control device 10 executes the separate mode at the start of charging the battery 2, and then executes the series mode. According to such a mode switching process at the time of battery charging, it is possible to prepare for the transition to the series mode by executing the separate mode according to the situation of the power converter 5 and the battery 2 at the start of battery charging. For example, when the temperature of the power converter 5 is extremely high at the start of battery charging, it is possible to execute separate basic mode to lower the temperature of the power converter 5 and then shift to the series mode. When the temperature of the battery 2 is extremely low at the start of battery charging, it is possible to increase the temperature of the battery 2 by executing separate heating mode and then shift to the series mode.

Next, a specific processing procedure of the mode switching process at the time of battery charging will be described with reference to FIGS. 7 and 8.

Figure 7:
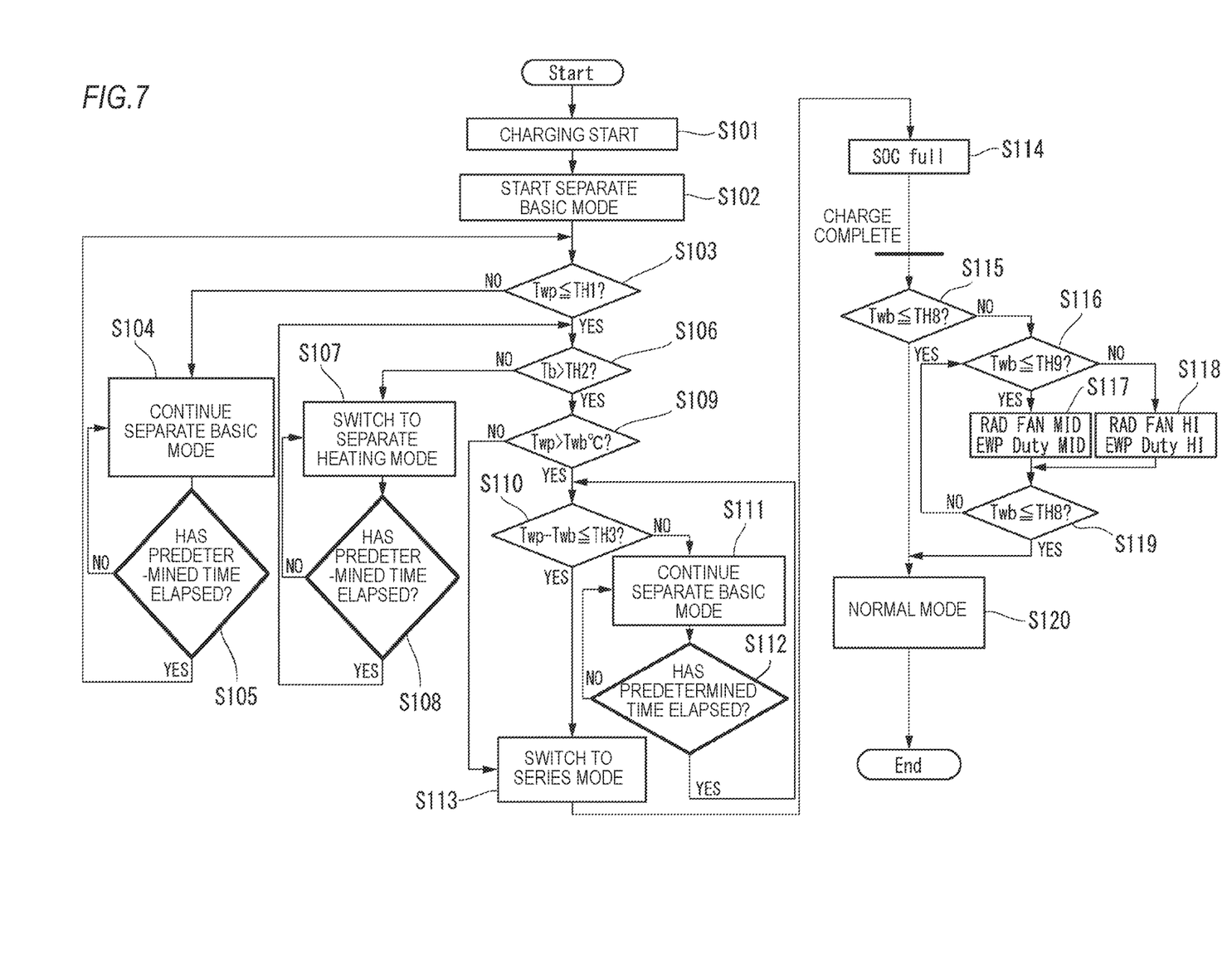
FIG. 7 is a flowchart illustrating a mode switching processing procedure of the temperature adjustment circuit of FIG. 2 during battery charging.

As illustrated in FIG. 7, the control device 10 determines (S103) whether the power converter medium temperature Twp is equal to or less than a first predetermined value TH1 after (S102) starting the separate basic mode in response to (S101) the charging start of the battery 2. When the determination result of Step S103 is NO, the control device 10 continues (S104) the separate basic mode until a predetermined time has elapsed (S105), and then performs the determination process of Step S103 again. That is, when the temperature of the power converter 5 is high, in a state where, by continuing the separate basic mode, the flow rate of the heat medium for cooling the power converter 5 is secured, by exchanging heat between only the second temperature adjustment circuit 6 and the outside air using the radiator 12, the power converter 5 can be cooled early.

When the determination result of Step S103 is YES, the control device 10 determines whether the battery temperature Tb is higher than a second predetermined value TH2 (TH2<TH1) (S106), and when the result of this determination is NO, the separate heating mode is executed (S107) until the predetermined time has elapsed (S108), and then the determination processing of Step S106 is performed again. That is, when the temperature of the battery 2 is low, the battery 2 can be heated early by executing the separate heating mode.

When the determination result of Step S106 is YES, the control device 10 determines whether the power converter medium temperature Twp is higher than the battery medium temperature Twb (S109), and when the determination result is NO, the mode is switched to the series mode (S113). That is, when the temperature of the battery 2 is higher than the temperature of the power converter 5, by shifting the mode to the series mode, it is possible to positively cool the battery 2 and the charger 3 which generate a large amount of heat when charging the battery.

When the determination result of Step S109 is YES, the control device 10 determines whether the temperature difference between the power converter medium temperature Twp and the battery medium temperature Twb is a third predetermined value TH3 or less (S110), and when the determination result is NO, the separate basic mode is continued (S111) until the predetermined time has elapsed (S112), and then the determination process of Step S110 is performed again. That is, when the temperature of the power converter 5 is higher than the temperature of the battery 2 and the temperature difference is large, by continuing the separate mode, it is possible to prevent the temperature of the battery 2 from rising sharply.

When the determination result of Step S110 is YES, the control device 10 switches the mode to the series mode (S113). That is, when the temperature of the power converter 5 is higher than the temperature of the battery 2 but the temperature difference is small, by changing the mode to the series mode, it is possible to cool the battery 2 and the charger 3 by using the radiator 12 provided in the second temperature adjustment circuit 6 while suppressing the influence on the battery 2.

Figure 8:
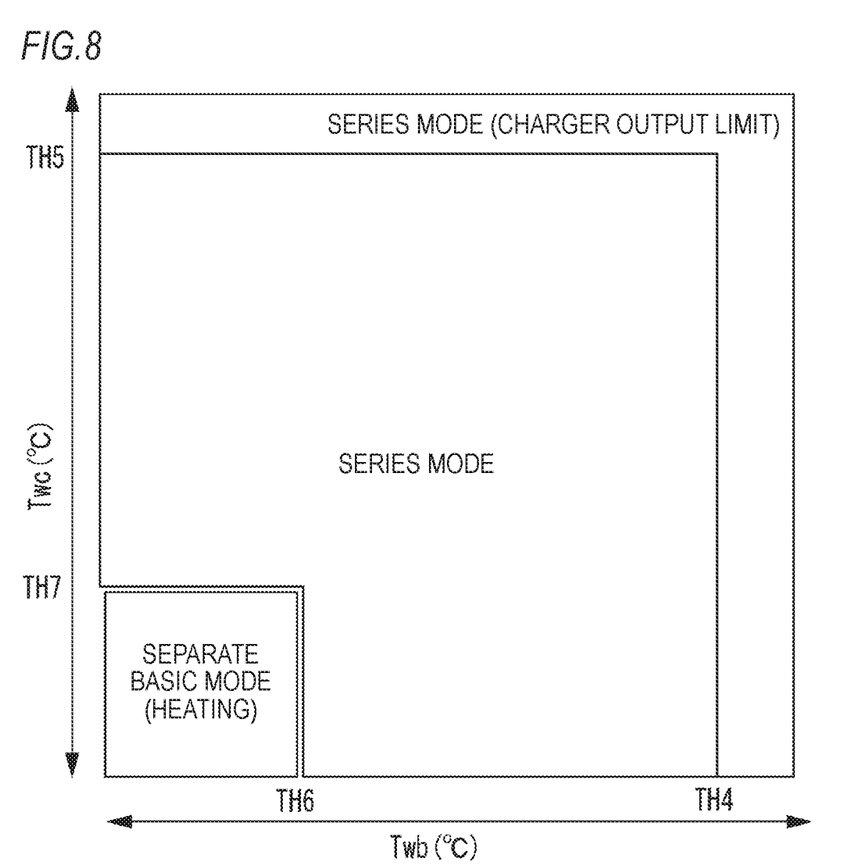
FIG. 8 is an explanatory diagram illustrating a control map after series mode switching during battery charging.

The control device 10 controls the output of the charger 3 based on the battery medium temperature Twb and the charger medium temperature Twc, as illustrated in a control map of FIG. 8, and performs the mode switching process from the switching to the series mode (S113) to the completion of charging (S114).

Specifically, the control device 10 limits the output of the charger 3 when either the battery medium temperature Twb is higher than a fourth predetermined value TH4 or the charger medium temperature Twc is higher than a fifth predetermined value TH5. That is, when the temperature of the battery 2 and/or the temperature of the charger 3 is abnormally high, damage to the battery 2 and/or the charger 3 can be avoided by controlling the output of the charger 3.

Also, when the battery medium temperature Twb is a sixth predetermined value TH6 (TH6<TH4) or less and the charger medium temperature is a seventh predetermined value TH7 (TH7<TH5) or less, the control device 10 changes the mode from the series mode to the separate heating mode. That is, when the temperature of the battery 2 and the temperature of the charger 3 are abnormally low, the battery 2 can be heated early by changing the mode from the series mode to the separate heating mode. Under normal temperature environment, after shifting the mode to the series mode, the series mode is maintained until charging of the battery 2 is completed.

Returning to FIG. 7, after the battery 2 is completely charged (S114), the control device 10 determines whether the battery medium temperature Twb is equal to or lower than an eighth predetermined value TH8 (S115), and when the result of this determination is YES, the mode shifts to the normal mode (S120) and the cooling of the battery 2 and the charger 3 is stopped. The normal mode has a low relevance to the present invention, so a detailed description thereof will be omitted. However, briefly, in the normal mode, the control device 10 determines from the temperature information of the battery 2 whether the battery request is a heating request, a heat retention request, a cooling request, or a strong cooling request and selects any one of the separate heating mode, the separate basic mode, the series mode, and the separate cooling mode.

On the other hand, when the determination result of Step S115 is NO, that is, when the battery medium temperature Twb is higher than the eight predetermined value TH8, the control device 10 changes the output of the radiator 12 (cooling fan) and the output of the second pump EWP2 according to the battery medium temperature Twb while continuing to cool the battery 2 and the charger 3 in the series mode. That is, when the temperature of the battery 2 is high after charging of the battery 2 is completed, there is a possibility that it could be a hindrance to normal driving. Therefore, it is possible to cool the battery 2 early by changing the output of the radiator 12 and the output of the second pump EWP2 according to the battery medium temperature Twb while continuing to cool the battery 2 and the charger 3 in the series mode.

More specifically, when the determination result of Step S115 is NO, the control device 50 determines whether the battery medium temperature Twb is equal to or less than a ninth predetermined value TH9 (TH9>TH8) (S116), and when the determination result is YES, the output of the radiator 12 and the output of the second pump EWP2 are set to a middle level (MID) (S117), and when the determination result is NO, cooling of the battery 2 and the charger 3 in series mode is continued until the battery medium temperature Twb becomes equal to or less than the eight predetermined value TH8 (S119) while the output of the radiator 12 and the output of the second pump EWP2 are set to a high level (HI) (S118).

Modification Example

Next, a modification example of the mode switching processing procedure at the time of battery charging will be described with reference to FIG. 9. However, regarding the same processing procedure as that of the embodiment described above, the same reference letters and numerals as those of the embodiment described above are used and the description of the embodiment described above is cited.

Figure 9:
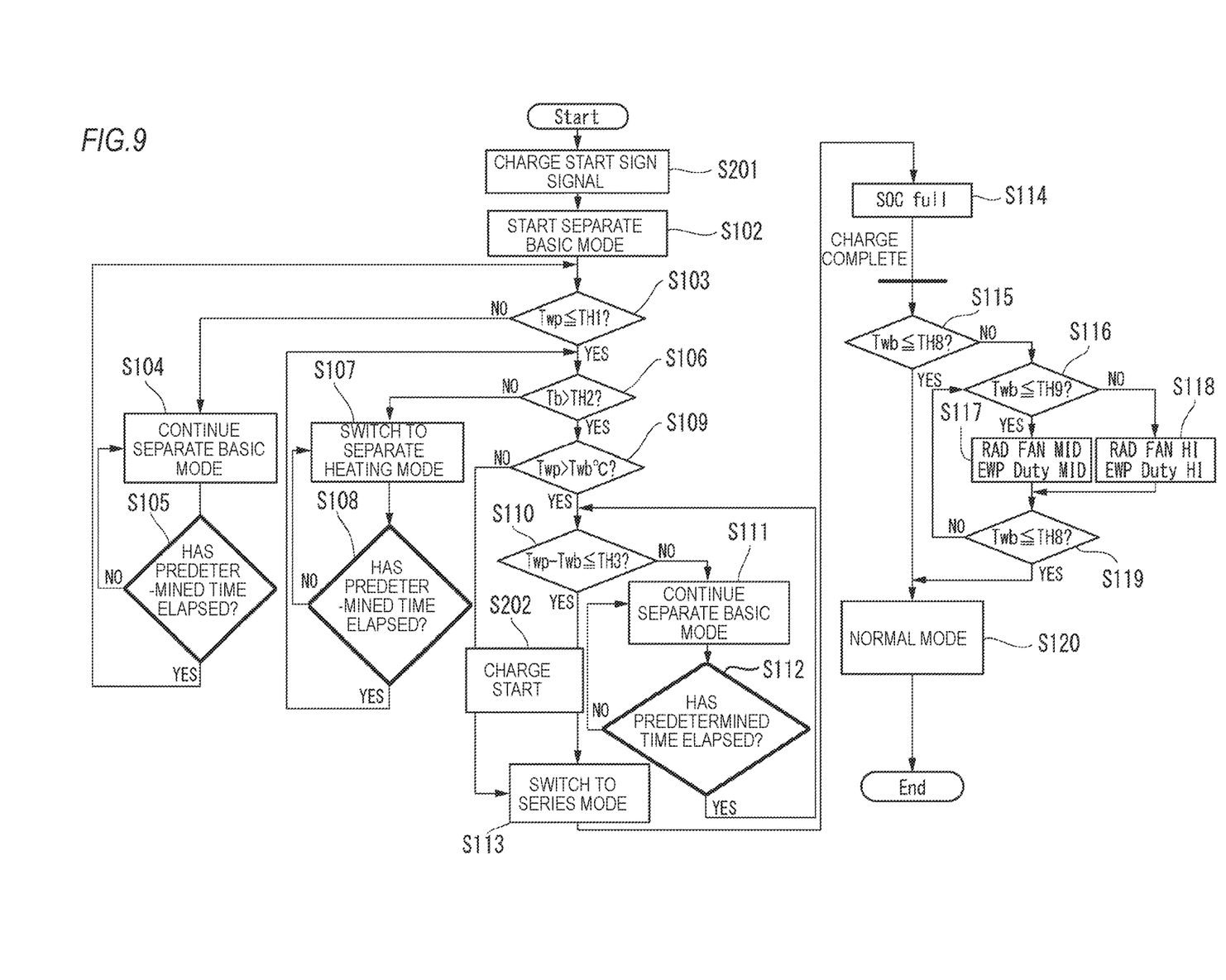
FIG. 9 is a flowchart illustrating a modification example of the mode switching processing procedure when charging the battery of the temperature adjustment circuit of FIG.

The modification example illustrated in FIG. 9 is different from the embodiment described above in that the control device receives a charge start sign signal before charging the battery 2, executes the separate mode before starting the charging of the battery 2, and then executes the series mode. According to such a modification example, by receiving the charge start sign signal before charging the battery 2 and executing the separate mode before starting the charging of the battery 2, and then executing the series mode, preparations for charging the battery 2 can be made in advance.

Examples of the charge start sign signal include a charging timer setting signal from a smartphone application, a charging lid open signal from a smart key, and an operation signal of a charging lid open button provided on a vehicle. Also, as illustrated in FIG. 9, when the control device receives the charge start sign signal (S201), it starts the separate basic mode (S102), and then executes the same processing procedure as that of the above-described embodiment until Step S112, and when the battery 2 is started to be charged (S202), the mode is switched to the series mode (S113). After switching the mode to the series mode in S113, the same processing procedure as in the embodiment described above is executed.

Although the embodiments of the present invention are described above, the present invention is not limited to the embodiments described above and various modifications and improvements can be made as appropriate.

For example, in the embodiments described above, as the first temperature, the battery temperature Tb, which is the temperature of the battery 2 (cell), and the battery medium temperature Twb, which is the temperature of the heat medium at the inlet of the battery 2, are exemplified, but it may be the temperature of the cooling portion of the battery 2. Further, in the embodiment described above, although the power converter medium temperature Twp, which is the temperature of the heat medium at the inlet of the power converter 5, is exemplified as the second temperature, the temperature of the power converter 5 itself or the temperature of the cooling portion of the power converter 5 may be used. Further, in the embodiment described above, although the charger medium temperature Twc, which is the temperature of the heat medium at the inlet of the charger 3, is exemplified as the third temperature, it may be the temperature of the charger 3 itself or the temperature of the cooling portion of the charger 3.

At least the following matters are described in the present specification. Although the constituent elements and the like corresponding to the embodiment described above are shown in parentheses, the present invention is not limited to this.

(1) A vehicle (vehicle 100) which includes a battery (battery 2), a power converter (power converter 5), a charger (charger 3), a first temperature adjustment circuit (first temperature adjustment circuit 4) including a first pump (first pump EWP1) for supplying a heart medium to the battery and the charger, a second temperature adjustment circuit (second temperature adjustment circuit 6) including a second pump (second pump EWP2) for supplying the heat medium to the power converter and a heat exchange unit (radiator 12) for exchanging heat between the heat medium and the outside air, a coupling passage (first coupling passage 8, second coupling passage 9) which forms a coupling circuit (coupling circuit 7) by coupling the first temperature adjustment circuit and the second temperature adjustment circuit, a switching unit (first electromagnetic switching valve EWV1) capable of switching a state between a circulation state in which the heat medium can circulate in the coupling circuit and a non-circulation state in which the heat medium cannot circulate in the coupling circuit, and a control device (control device 10) to select one mode from a plurality of modes, where the plurality of modes includes, a series mode in which the heat medium is circulated in the coupling circuit in the circulation state, and a separate mode in which the heat medium is circulated in at least the second temperature adjustment circuit in the non-circulation state, and the control device executes the series mode when charging the battery.

According to (1), by executing the series mode when charging the battery, the heat exchange unit provided in the second temperature adjustment circuit can be used to cool the charger and the battery. As a result, it is possible to efficiently cool the charger and the battery when charging the battery.

(2) The vehicle according to (1), where the control device starts charging the battery, and after executing the separate mode, executes the series mode.

According to (2), by executing the separate mode before executing the series mode, it is possible to grasp the status of the power converter and the battery and prepare for the transition to the series mode.

(3) The vehicle according to (1), where the control device receives a charge start sign signal before charging the battery, executes the separate mode before starting the charge of the battery, and then executes the series mode.

According to (3), it is possible to prepare for charging the battery in advance by receiving the charge start sign signal before charging the battery, executing the separate mode before starting the charge of the battery, and then executing the series mode.

(4) The vehicle according to (2) or (3), where the vehicle further includes, a first temperature acquisition unit (battery temperature sensor Sb, battery medium temperature sensor Swb) which acquires a first temperature (battery temperature Tb, battery medium temperature Twb) which is a temperature of the battery, and a second temperature acquisition unit (power converter medium temperature sensor Swp) which acquires a second temperature (power converter medium temperature Twp) which is a temperature of the power converter, and the control device executes the separate mode, and then controls change from the separate mode to the series mode based on the first temperature and the second temperature.

According to (4), by controlling the change from the separate mode to the series mode based on the temperature of the battery and the temperature of the power converter, the temperature of the battery and the power converter can be appropriately managed.

(5) The vehicle according to (4), where the control device executes the separate mode, and then continues the separate mode when the second temperature is higher than a first predetermined value (first predetermined value TH1).

According to (5), by continuing the separate mode when the temperature of the power converter is high, the flow rate of the heat medium for cooling the power converter can be secured, and thus the power converter can be cooled early.

(6) The vehicle according to (4) or (5), where the vehicle further includes a heating unit (heater 17) in the first temperature adjustment circuit, and after executing the separate mode, the control device continues the separate mode in a state where the first pump and the heating unit are operated when the first temperature is equal to or lower than a second predetermined value (second predetermined value TH2).

According to (6), when the temperature of the battery is low, the battery can be heated early by continuing the separate mode in a state where the first pump and heating unit are operated.

(7) The vehicle according to any one of (4) to (6), where after executing the separate mode, the control device changes the mode from the separate mode to the series mode when the second temperature is equal to or lower than the first temperature.

According to (7), when the temperature of the battery is higher than the temperature of the power converter, by shifting the mode to the series mode, it is possible to positively cool the battery having a large heat generation amount during charging.

(8) The vehicle according to any one of (4) to (7), where
after executing the separate mode, the control device continues the separate mode when the second temperature is higher than the first temperature and a temperature difference between the second temperature and the first temperature is higher than a third predetermined value (third predetermined value TH3).

According to (8), when the temperature of the power converter is higher than the temperature of the battery and the temperature difference is large, by continuing the separate mode, it is possible to prevent the temperature of the battery from rising sharply.

(9) The vehicle according to any one of (4) to (8), where
after executing the separate mode, the control device changes the mode from the separate mode to the series mode when the second temperature is higher than the first temperature and the temperature difference between the second temperature and the first temperature is equal to or less than the third predetermined value (third predetermined value TH3).

According to (9), when the temperature of the power converter is higher than the temperature of the battery, but the temperature difference is small, by changing the mode to the series mode, it is possible to cool the battery by using the heat exchange unit provided in the second temperature adjustment circuit while suppressing the influence on the battery.

(10) The vehicle according to any one of (4) to (9), where
the vehicle further includes a third temperature acquisition unit (charger medium temperature sensor Swc) which acquires a third temperature (charger medium temperature Twc) which is a temperature of the charger, and
the control device controls an output of the charger based on the first temperature and the third temperature in the series mode.

According to (10), during the series mode, the control can be facilitated by controlling the output of the charger based on the temperatures of the battery and the charger which generate a large amount of heat during charging.

(11) The vehicle according to (10), where
the control device limits the output of the charger when either of the first temperature is higher than a fourth predetermined value (fourth predetermined value TH4) and the third temperature is higher than a fifth predetermined value (fifth predetermined value TH5).

According to (11), when the temperature of the battery and/or the temperature of the charger is abnormally high, damage to the battery and/or the charger can be avoided by controlling the output of the charger.

(12) The vehicle according to any one of (4) to (9), where
the vehicle further includes a third temperature acquisition unit (charger medium temperature sensor Swc) which acquires a third temperature (charger medium temperature Twc) which is a temperature of the charger, and
the control device controls a change from the series mode to the separate mode based on the first temperature and the third temperature in the series mode.

According to (12), during the series mode, the control can be facilitated by controlling the change from the series mode to the separate mode based on the temperatures of the battery and the charger which generate a large amount of heat during charging.

(13) The vehicle according to (12), where
the vehicle further includes a heating unit (heater 17) in the first temperature adjustment circuit, and
the control device changes the mode from the series mode to the separate mode when the first temperature is equal to or less than a sixth predetermined value (sixth predetermined value TH6) and when the third temperature is equal to or less than a seventh predetermined value (seventh predetermined value TH7) and operates the first pump and the heating unit.

According to (13), when the temperature of the battery and the temperature of the charger are low, the battery can be heated early by changing the mode from the series mode to the separate mode and operating the first pump and heating unit.

(14) The vehicle according to any one of (4) to (11), where
the control device changes an output of the heat exchange unit and an output of the second pump according to the first temperature when the first temperature is higher than an eight predetermined value (eighth predetermined value TH8) after charging of the battery is completed.

According to (14), after charging of the battery is completed, when the temperature of the battery is high, the output of the heat exchange unit and the output of the second pump can be changed according to the temperature of the battery to cool the battery early.

What is claimed is:
1. A vehicle comprising:
a battery,
a power converter,
a charger,
a first temperature adjustment circuit including a first pump for supplying a heat medium to the battery and the charger,
a second temperature adjustment circuit including a second pump for supplying the heat medium to the power converter and a heat exchange unit for exchanging heat between the heat medium and the outside air,
a coupling passage which forms a coupling circuit by coupling the first temperature adjustment circuit and the second temperature adjustment circuit,
a switching unit capable of switching a state between a circulation state in which the heat medium can circulate in the coupling circuit and a non-circulation state in which the heat medium cannot circulate in the coupling circuit, and
a control device to select one mode from a plurality of modes,
wherein the plurality of modes includes:
a series mode in which the heat medium is circulated in the coupling circuit in the circulation state; and
a separate mode in which the heat medium is circulated in at least the second temperature adjustment circuit in the non-circulation state, and
wherein the control device executes the series mode when charging the battery.

2. The vehicle according to claim 1, wherein the control device starts charging the battery, and after executing the separate mode, executes the series mode.

3. The vehicle according to claim 1, wherein the control device receives a charge start sign signal before charging the battery, executes the separate mode before starting the charge of the battery, and then executes the series mode.

4. The vehicle according to claim 2, further comprising:
a first temperature acquisition unit which acquires a first temperature which is a temperature of the battery, and
a second temperature acquisition unit which acquires a second temperature which is a temperature of the power converter,
wherein the control device executes the separate mode, and then controls change from the separate mode to the series mode based on the first temperature and the second temperature.

5. The vehicle according to claim 4, wherein the control device executes the separate mode, and then continues the separate mode when the second temperature is higher than a first predetermined value.

6. The vehicle according to claim 4, further comprising:
a heating unit in the first temperature adjustment circuit,
wherein after executing the separate mode, the control device continues the separate mode in a state where the first pump and the heating unit are operated when the first temperature is equal to or lower than a second predetermined value.

7. The vehicle according to claim 4, wherein after executing the separate mode, the control device changes the mode from the separate mode to the series mode when the second temperature is equal to or lower than the first temperature.

8. The vehicle according to claim 4, wherein after executing the separate mode, the control device continues the separate mode when the second temperature is higher than the first temperature and a temperature difference between the second temperature and the first temperature is higher than a third predetermined value.

9. The vehicle according to claim 4, wherein after executing the separate mode, the control device changes the mode from the separate mode to the series mode when the second temperature is higher than the first temperature and the temperature difference between the second temperature and the first temperature is equal to or less than the third predetermined value.

10. The vehicle according to claim 4, further comprising:
a third temperature acquisition unit which acquires a third temperature which is a temperature of the charger,
wherein the control device controls an output of the charger based on the first temperature and the third temperature in the series mode.

11. The vehicle according to claim 10, wherein the control device limits the output of the charger when either of the first temperature is higher than a fourth predetermined value and the third temperature is higher than a fifth predetermined value.

12. The vehicle according to claim 4, further comprising:
a third temperature acquisition unit which acquires a third temperature which is a temperature of the charger,
wherein the control device controls a change from the series mode to the separate mode based on the first temperature and the third temperature in the series mode.

13. The vehicle according to claim 12, further comprising:
a heating unit in the first temperature adjustment circuit,
wherein the control device changes the mode from the series mode to the separate mode when the first temperature is equal to or less than a sixth predetermined value and when the third temperature is equal to or less than a seventh predetermined value and operates the first pump and the heating unit.

14. The vehicle according to claim 4,
wherein the control device changes an output of the heat exchange unit and an output of the second pump according to the first temperature when the first temperature is higher than an eight predetermined value after charging of the battery is completed.

* * * * *